(12) United States Patent
Tang et al.

(10) Patent No.: US 12,045,663 B2
(45) Date of Patent: Jul. 23, 2024

(54) SERVERLESS COMPUTING-BASED, CONTINUOUS GATEWAY WATCH FOR DATA CHANGE

(71) Applicant: INTERNATIONAL BUSINESS MACHINES CORPORATION, Armonk, NY (US)

(72) Inventors: Gang Tang, Nanjing (CN); Peng Hui Jiang, Beijing (CN); Ming Shuang Xian, Wuxi (CN); Qin Yue Chen, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 17/821,890

(22) Filed: Aug. 24, 2022

(65) Prior Publication Data
US 2024/0069976 A1     Feb. 29, 2024

(51) Int. Cl.
*G06F 15/173*     (2006.01)
*G06F 9/50*     (2006.01)
(Continued)

(52) U.S. Cl.
CPC .......... *G06F 9/5055* (2013.01); *G06F 21/554* (2013.01); *H04L 9/40* (2022.05); *H04L 43/00* (2013.01)

(58) Field of Classification Search
CPC .................................. H04L 9/40; H04L 43/00
See application file for complete search history.

(56) References Cited

U.S. PATENT DOCUMENTS

| 2011/0246817 A1 | 10/2011 | Orsini et al. |
| 2016/0154855 A1 | 6/2016 | Hsiao et al. |

(Continued)

FOREIGN PATENT DOCUMENTS

CN     111897564 A     11/2020

OTHER PUBLICATIONS

NPL article from source ceur-ws.org, vol. 2456, Bebee et al. "Enabling an Enterprise Data Management Ecosystem using Change Data Capture with Amazon Neptune," Oct. 2019 (Year: 2019).*

(Continued)

*Primary Examiner* — Padma Mundur
(74) *Attorney, Agent, or Firm* — Aaron Pontikos, Esq.; Kevin Radigan, Esq.; Heslin Rothenberg Farley & Mesiti P.C.

(57) ABSTRACT

A serverless computing-based, continuous gateway watch of a data store for data change process is provided. The process includes the gateway interface of the computing environment receiving a watch request from a user system to monitor the data store for data change. Based on receiving the watch request, the gateway interface invokes a serverless setup service to establish a connection between the gateway interface and the data store of the computing environment to be monitored for data change. Based on receiving, at the gateway interface, a data change indication from the data store, the gateway interface invokes a serverless message process service to mutate the data change indication from the data store into a mutated data change message indicative of a data change at the data store for return to the user system pursuant to the watch request, with the serverless message process service terminating thereafter.

20 Claims, 9 Drawing Sheets

(51) Int. Cl.
 *G06F 21/55* (2013.01)
 *H04L 9/40* (2022.01)
 *H04L 43/00* (2022.01)

(56) References Cited

U.S. PATENT DOCUMENTS

| | | |
|---|---|---|
| 2019/0377620 A1 | 12/2019 | Neijenhuis |
| 2020/0012569 A1 | 1/2020 | Natanzon et al. |
| 2021/0042160 A1* | 2/2021 | Alamouti .............. G06N 5/022 |
| 2021/0200527 A1 | 7/2021 | Sanchez et al. |
| 2021/0263779 A1 | 8/2021 | Haghighat et al. |
| 2021/0342145 A1* | 11/2021 | Miller ....................... G06F 8/60 |

OTHER PUBLICATIONS

Mel et al., "The NIST Definition of Cloud Computing," National Institute of Standards and Technology, Information Technology Laboratory, Special Publication 800-145, Sep. 2011 (pp. 1-7) (Year: 2011).

Munns, Chris, "Announcing WebSocket APIs in Amazon API Gateway", AWS Comput Blog, published online Dec. 18, 2018 at: https://aws.amazon.com/blogs/compute/announcing-websocket-apis-in-amazon-api-gateway/, (7 pages) (Year: 2018).

Alvarez-Palmer, Re, "Capturing Data Changes in Amazon Aurora Using AWS Lambda: AWS Database Blog", published Online Sep. 5, 2017, at: https://aw:S.amazon.com/blogs/database/ capturing-data-changes-in-amazon-aurora-us ing-aws-lambda/ (12 pages) (Year: 2017).

Amazon, "AWS—Apigateway-Kinesisstreams—AWS Solution Constructs", published Online Feb. 27, 2021, at: https://web.archive.org/web/20210227013734/https://docs.aws.amazon.com/solutions/latest/constructs/aws-apigateway-kinesiss treams.html (5 pages) (Year: 2021).

International Search Report (ISR) & Written Opinion for PCT Application No. PCT/EP2023/070142, dated Sep. 17, 2023 (11 pages) (Year: 2023).

* cited by examiner

| FaaS | ASYNC OR SYNC | INPUT | IMPLEMENTATION | OUTPUT | TRIGGER CONDITION | COLD START | TIMEOUT |
|---|---|---|---|---|---|---|---|
| SETUP SERVICE/FUNCTION | SYNC | METADATA ABOUT USER ORIGINAL REQUEST | ESTABLISH UPSTREAM CONNECTION BETWEEN GATEWAY AND DATA STORE | MESSAGE FROM UPSTREAM | PER REQUEST FROM USER SYSTEM | YES | DEFAULT |
| MESSAGE PROCESS SERVICE/FUNCTION | SYNC | METADATA FOR ESTABLISHING UPSTREAM CONNECTION | PROCESS THE CHANGE SEGMENT OF DATA STREAM AND RETURN THE MUTATED MESSAGE | MUTATED MESSAGE | CHANGE ON DATA STORE | NO | CUSTOMIZED |

FIG. 3B

RECEIVE, AT A GATEWAY INTERFACE OF THE COMPUTING ENVIRONMENT, A WATCH REQUEST FROM A USER SYSTEM TO MONITOR A DATA STORE FOR DATA CHANGE ~600

INVOKE, BY THE GATEWAY INTERFACE BASED ON RECEIVING THE WATCH REQUEST, A SERVERLESS SETUP SERVICE TO ESTABLISH A CONNECTION BETWEEN THE GATEWAY INTERFACE AND THE DATA STORE OF THE COMPUTING ENVIRONMENT TO BE MONITORED FOR DATA CHANGE ~602

INVOKE, BY THE GATEWAY SERVICE, A SERVERLESS MESSAGE PROCESSING SERVICE TO MUTATE A DATA CHANGE INDICATION FROM THE DATA STORE, RECEIVED AT THE GATEWAY INTERFACE ACROSS THE CONNECTION, INTO A MUTATED DATA CHANGE MESSAGE INDICATIVE OF A DATA CHANGE AT THE DATA STORE FOR RETURN TO THE USER SYSTEM PURSUANT TO THE WATCH REQUEST, AND TO TERMINATE THEREAFTER ~604

WHERE THE CONNECTION BETWEEN THE GATEWAY INTERFACE AND THE DATA STORE TO BE MONITORED FOR DATA CHANGE HAS AN UNBOUNDED EXECUTION TIME WHEN ESTABLISHED ~606

WHERE THE INVOKING OF THE SERVERLESS SETUP SERVICE INCLUDES INVOKING, BY THE GATEWAY INTERFACE, THE SERVERLESS SETUP SERVICE WITH USER PARAMETERS, ASSOCIATED WITH THE WATCH REQUEST, TO ESTABLISH THE CONNECTION BETWEEN THE GATEWAY INTERFACE AND THE DATA STORE TO BE MONITORED FOR DATA CHANGE ~608

FIG. 6A

FURTHER INCLUDING MONITORING, BY THE GATEWAY INTERFACE, THE CONNECTION BETWEEN THE GATEWAY INTERFACE AND THE DATA STORE FOR THE DATA CHANGE INDICATION FROM THE DATA STORE —610

FURTHER INCLUDING RECEIVING AT THE GATEWAY INTERFACE, ACROSS THE CONNECTION, THE DATA CHANGE INDICATION FROM THE DATA STORE, WHEREIN THE DATA CHANGE INDICATION FROM THE DATA STORE INCLUDES A FIRST DATA CHANGE INDICATION FORMAT, AND THE MUTATED DATA CHANGE MESSAGE FOR RETURN TO THE USER SYSTEM PURSUANT TO THE WATCH REQUEST INCLUDES A SECOND DATA CHANGE INDICATION FORMAT, THE SECOND DATA CHANGE INDICATION FORMAT BEING DIFFERENT FROM THE FIRST DATA CHANGE INDICATION FORMAT —612

FURTHER INCLUDING FACILITATING MAINTAINING ANOTHER UNBOUNDED EXECUTION TIME CONNECTION BETWEEN THE GATEWAY INTERFACE OF THE COMPUTING ENVIRONMENT AND THE USER SYSTEM BASED ON THE WATCH REQUEST —614

FURTHER INCLUDING RETURNING, BY THE GATEWAY INTERFACE ACROSS THE OTHER UNBOUNDED EXECUTION TIME CONNECTION, THE MUTATED DATA CHANGE MESSAGE TO THE USER SYSTEM PURSUANT TO THE WATCH REQUEST —616

WHERE THE SERVERLESS SETUP SERVICE IS A FIRST FUNCTION AS A SERVICE (FaaS), AND THE SERVERLESS MESSAGE PROCESSING SERVICE IS A SECOND FUNCTION AS A SERVICE (FaaS) —618

FIG. 6B

SERVERLESS COMPUTING-BASED, CONTINUOUS GATEWAY WATCH FOR DATA CHANGE

BACKGROUND

One or more aspects relate, in general, to processing within a computing environment, and in particular, to improving gateway-related processing within a computing environment.

A continuous change notification Application Programming Interface (API), or watch API, can be used by a client system to open a connection to an API server, which watches a specified data store, waiting for a change message from the API server over the connection. Whenever there is a data change in the specified data store, the client system receives back a message from the API server about the change.

In one or more implementations, a continuous change notification API is a server-based application used to resolve, for example, a cache invalidation problem; that is, how to determine when information being cached or displayed is no longer an appropriate representation of the underlying data store. Any type of cache invalidation, not only frontend or backend-related, can be built using a watch API server.

SUMMARY

Certain shortcomings of the prior art are overcome, and additional advantages are provided herein through the provision of a computer program product for facilitating processing within a computing environment. The computer program product includes one or more computer readable storage media and program instructions embodied therewith. The program instructions are readable by a processing circuit to cause the processing circuit to perform a method, which includes receiving, at a gateway interface of the computing environment, a watch request from a user system to monitor a data store for data change. Further, the method includes invoking, by the gateway interface based on receiving the watch request, a serverless setup service to establish a connection between the gateway interface and the data store of the computing environment to be monitored for data change. In addition, the method includes invoking, by the gateway service, a serverless message processing service to mutate a data change indication from the data store, received at the gateway interface across the connection, into a mutated data change message indicative of data change at the data store for return to the user system pursuant to the watch request, and to terminate thereafter.

By invoking, by the gateway interface based on receiving the watch request, a serverless setup service, and by invoking, by the gateway interface, the serverless message processing service, there are no limits on the service execution time because they are short-live serverless services. Each service is invoked when prompted by the respective event, and in one or more embodiments, the serverless services are not maintained long-live or active once the respective function is completed. In this manner, the cost for the serverless services is reduced from a full monitoring time window to a time window to complete the associated function when invoked by occurrence of the respective event. The costs associated with the serverless services are greatly reduced because there is no permanent connection to be maintained with the gateway interface. Further, no change is required of the data store, as the method works with a wide variety of data stores already supported.

In one or more embodiments, the connection between the gateway interface and the data store to be monitored data change has an unbounded execution time when established.

In one embodiment, the invoking of the serverless setup service includes invoking, by the gateway interface, the serverless setup service with user parameters, associated with the watch request, to establish the connection between the gateway interface and the data store to be monitored for the data change.

In one or more implementations, the method further includes monitoring, by the gateway interface, the connection between the gateway interface and the data store for the data change indication from the data store. In one or more embodiments, the method further includes receiving, at the gateway interface, across the connection, the data change indication from the data store, where the data change indication from the data store includes a first data change indication format, and the mutated data change message for return to the user system includes a second data change indication format, and where the second data change indication format is different from the first data change indication format.

In one or more embodiments, the method further includes facilitating maintaining another unbounded execution time connection between the gateway interface of the computing environment and the user system based on the watch request. In one embodiment, the method includes returning, by the gateway interface across the other unbounded execution time connection, the mutated data change message to the user system pursuant to the watch request.

In one embodiment, the serverless setup service is a first function as a service (FaaS), and the serverless message processing service is a second function as a service (FaaS).

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3B is a data structure depicting one embodiment of a serverless setup service/function workflow and a serverless message process service/function workflow, in accordance with one or more aspects of the present invention;

FIGS. 6A-6B depict another embodiment of a serverless computing-based, continuous gateway watch workflow, in accordance with one or more aspects of the present invention.

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Figure 1:
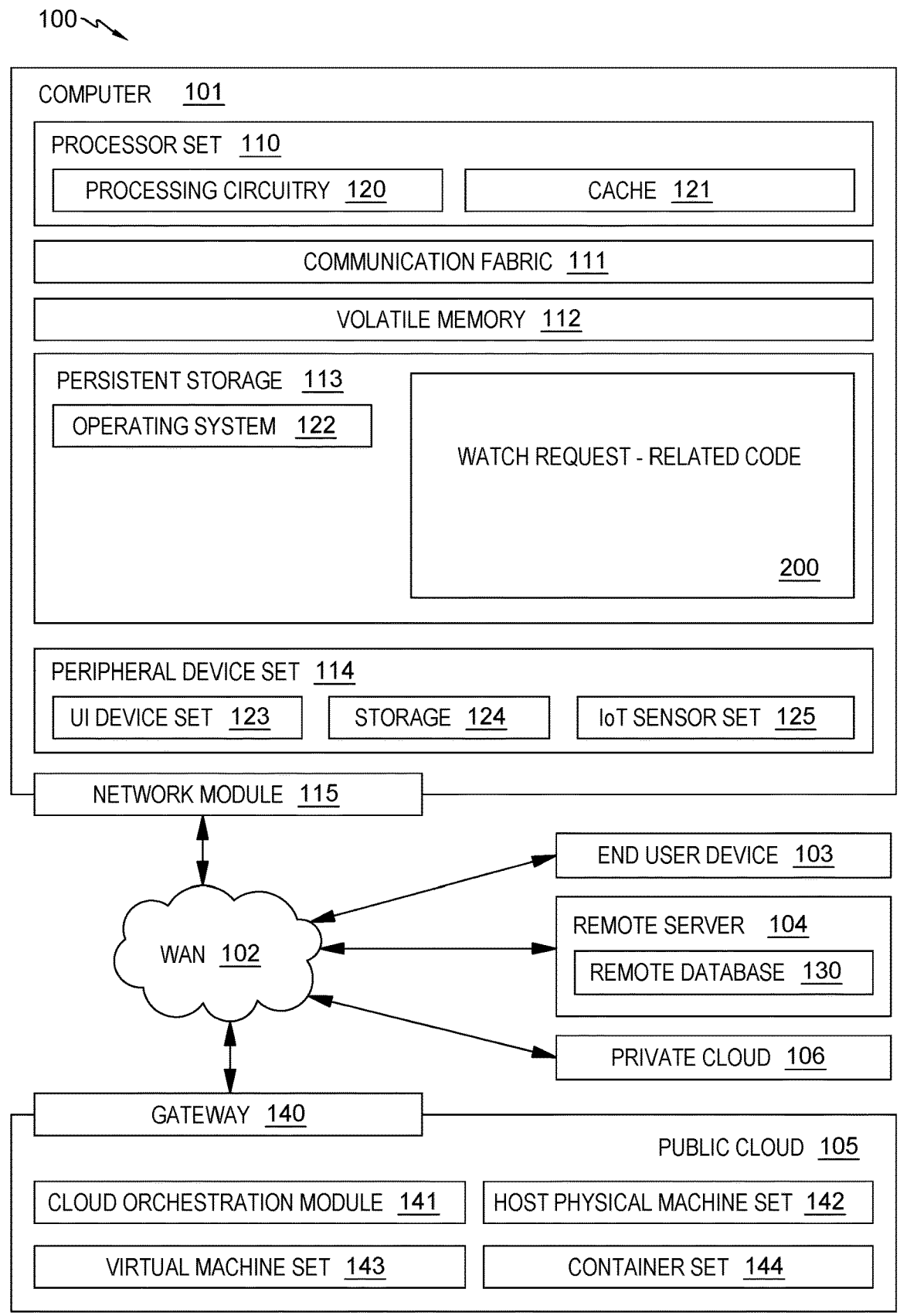
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1 as operating system 122 and watch request-related code 200, which are stored in persistent storage 113, as well as gateway 140, cloud orchestration module 141, virtual machine set 143, and container set 144, which are part of, or associated with, public cloud 105, in the example computing environment 100 of FIG. 1. In another example, program code depicted in the computing environment of FIG. 7 includes, in part, application program(s) 716, operating system 718, gateway interface 720, serverless services 721, data store(s) 722, and computer-readable program instruction(s) 723, which are stored in memory 706 of computer system 702.

As context, containerization is the packaging of software code (for instance, to implement a service or microservice) with its dependencies, such as operating system libraries and/or other dependencies, used to run the software code to create a single, lightweight executable, referred to as a container. The container is portable in that it runs consistently and reliably on any information technology infrastructure. In one or more embodiments, the software code can be an application, such as an edge application or edge service instance in the case of edge-based computing. A container is created from a container image, which is a static file that includes executable program code that can be run as an isolated process on a computing or information technology (IT) infrastructure. One image can be used to run one or more containers, which are runtime instances of the container image. Containers are lightweight (e.g., they share the machine's operating system), efficient, easy to manage, secure, and portable.

One example of a product used to provide and manage containers is Kubernetes®, which is an open-source system for automating deployment, scaling and management of containerized applications. (Kubernetes® is a Registered Trademark of the Linux Foundation in at least one jurisdiction.) Kubernetes groups containers that make up an application into logical units for easy management and discovery. In operation, Kubernetes orchestrates a containerized application to run on a cluster of hosts (or nodes), and automates deployment and management of cloud-native applications using on-premise infrastructure or public cloud platforms. The Kubernetes system is designed to run containerized applications across a cluster of nodes (or servers or devices), which can be at a single geographic location or distributed across multiple geographic locations. In one or more implementations, a cluster is a set of nodes (whether physical computing resources or virtual computing resources) running Kubernetes agents, managed by the Kubernetes control plane.

Container orchestration is the automation of much of the operational effort required to run containerized workloads and services. Orchestration includes a wide range of processes required to maintain a container's lifecycle, including provisioning, deployment, scaling (up and down), networking, load-balancing, and more. Note that Kubernetes is one example only of a orchestration platform that can be used to manage, for instance, service deployment, such as disclosed herein. In one or more embodiments, other platforms, such as Docker™, can be used to manage service deployment, in accordance with one or more aspects disclosed. (Docker™ is a Trademark or Registered Trademark of Docker, Inc., of San Francisco, California, USA.)

As noted, a continuous change notification Application Program Interface (API), or watch API, can be used to resolve, for instance, a cache invalidation issue; that is, how to determine when information being displayed or cached is no longer an appropriate representation of the underlying data store. Any sort of cache invalidation, not only backend/frontend-related, can be built using a watch API. With a watch API, a user system opens a connection to an API server, which watches the specified data store, waiting for a repeated message from the data store server over the connection. Whenever there is a change on the data store, the user system receives a message about the change. The connection to the data store server remains alive until the application is finished. A number of watch API examples are known, including couchDB and etcd implemented examples.

The watch API is also widely used in mobile and web applications. A common architecture or workflow includes a client application establishing a connection to an API server watching for a resource change. The API server is stateless, and is not the source of the resource. The API server, in turn, watches an upstream data store, which can be the source of the resource. When the API server receives a message from the watched data store, it processes the message to filter, enrich, transform, etc., the message, and deliver the processed message to the client application.

The client application will typically not monitor the upstream data store directly since the API server assists with client authentication and authorization, and usually, it is desirable not to disclose the underlying data store data structure and schema to the client application, or expose the data store credentials to the client application for security reasons.

As an alternate embodiment, a web-based application can be built with serverless computing, which is efficient and less expensive than implementing an API server. The issue, however, is that a web application cannot use long-live watch functionality with serverless computing. For instance, there is currently a limit on such function execution time. For example, a maximum timeout for existing serverless compute services that run code in response to events is 900 seconds, which means a single invocation of the platform cannot execute longer than 900 seconds. Further, the cost is relatively high, as the serverless platform function is charged by the execution time, including the time when the function is sleeping and/or blocking for input/outputs.

Prior to describing embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive-related methods, including watch request-related code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
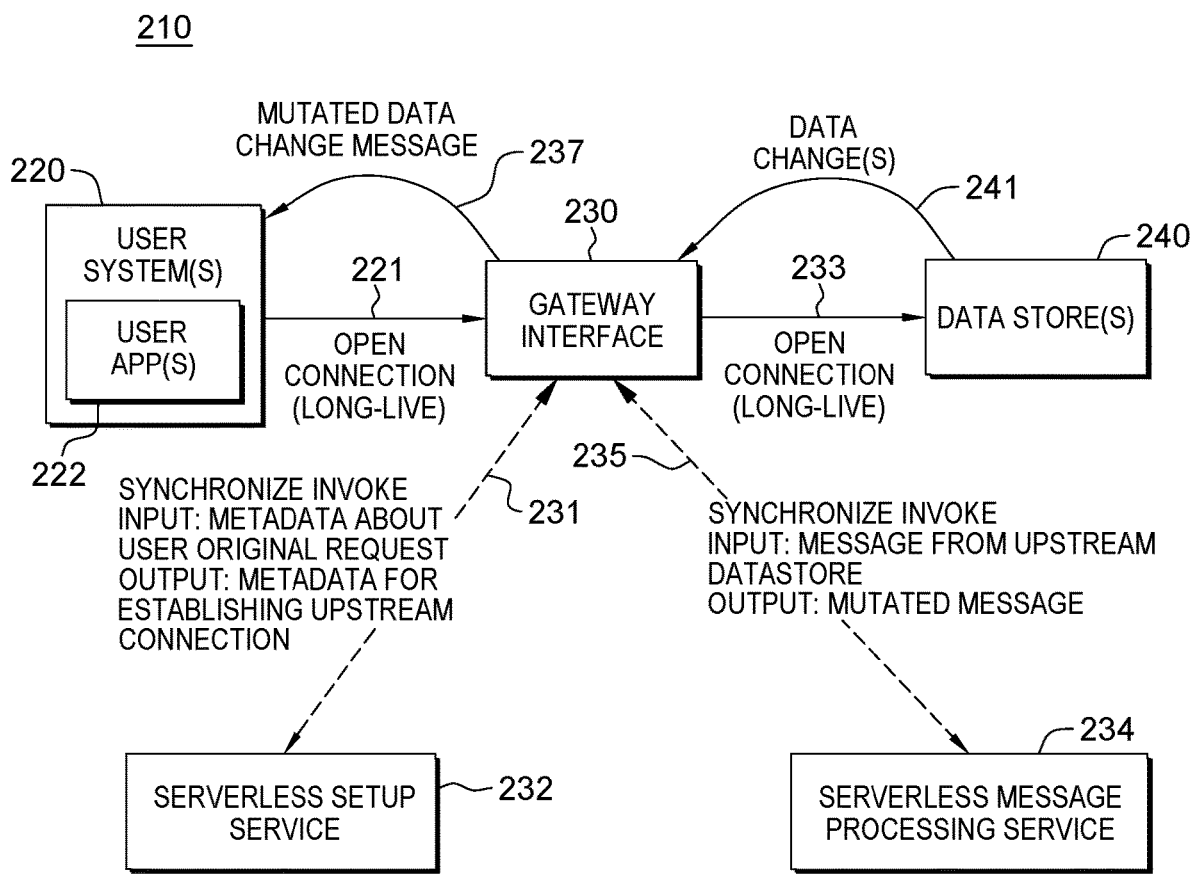
FIG. 2 depicts another embodiment of a computing environment to incorporate and/or use one or more aspects of the present invention.

As discussed, embodiments of the present invention include computer program products, computer-implemented methods, and computer systems, where program code executing on one or more processors performs a serverless computing-based, continuous gateway watch for data change in a data store, one embodiment of which is depicted (by way of example) in the computing environment 210 implementation of FIG. 2. As illustrated, one or more user systems 220 (or client systems) with one or more applications 222 can open respective long-live connections 221 (i.e., unbounded execution time connections) to a gateway interface 230, which can be part of, or associated with, a gateway, such as gateway 140 in the computing environment embodiment of FIG. 1. In one or more implementations, gateway interface 230 is to monitor one or more data stores 240 for data change. By way of example, data store(s) 240 can be one or more databases, data storage systems, data sources, etc., which can experience a change in data over time.

In one or more implementations, gateway interface 230 includes an agent to receive a watch request from user system 220 to monitor data store 240 for data change. The request can be received over open connection 221. With receipt of the watch request, gateway interface 230 invokes 231 a serverless setup service 232 implemented, in one embodiment, as a function as a service (FaaS). The invoking is synchronized to receipt of the watch request, with input being, in one embodiment, metadata about the user's original request, and output of the serverless setup service 232 being metadata to facilitate establishing an upstream connection, that is, for establishing an open connection 233 between gateway interface 230 and data store 240, in one example. This connection 233 is a second long-live connection, that is, a connection that has an unbounded execution time when established.

In addition to having an agent, for instance, a software agent, within gateway interface 230 to accept or receive a watch request from a user system, gateway interface 230 also has an agent, for instance, a software agent, to monitor data store 240 for a data change. For instance, in one or more implementations, gateway interface 230 can receive or capture data change segments or other data change indications 241, and responsive to receiving a data change segment, can invoke 235 or spawn a serverless message processing service 234. In one embodiment, invoking of serverless message processing service 234 includes providing as input the data change segment or data change indication received from data store 240 over the open connection between gateway interface 230 and data store 240. In one embodiment, serverless message processing service 234 returns a mutated data change message to gateway interface 230, and gateway interface 230 returns the mutated data change message 237 to user system 220, such as the user app 222, which initiated the watch request. Note that in one or more embodiments, serverless setup service/function 232 can be, for instance, received from, or identified by, user system 220, as can serverless message processing service/function 234. Both can be provided by the user system/application to ensure, for instance, that the connection open between the gateway and data store is pursuant to user requirements, and that the mutated data change message returned to the user system/application is formatted as required by the user application.

Figure 3A:
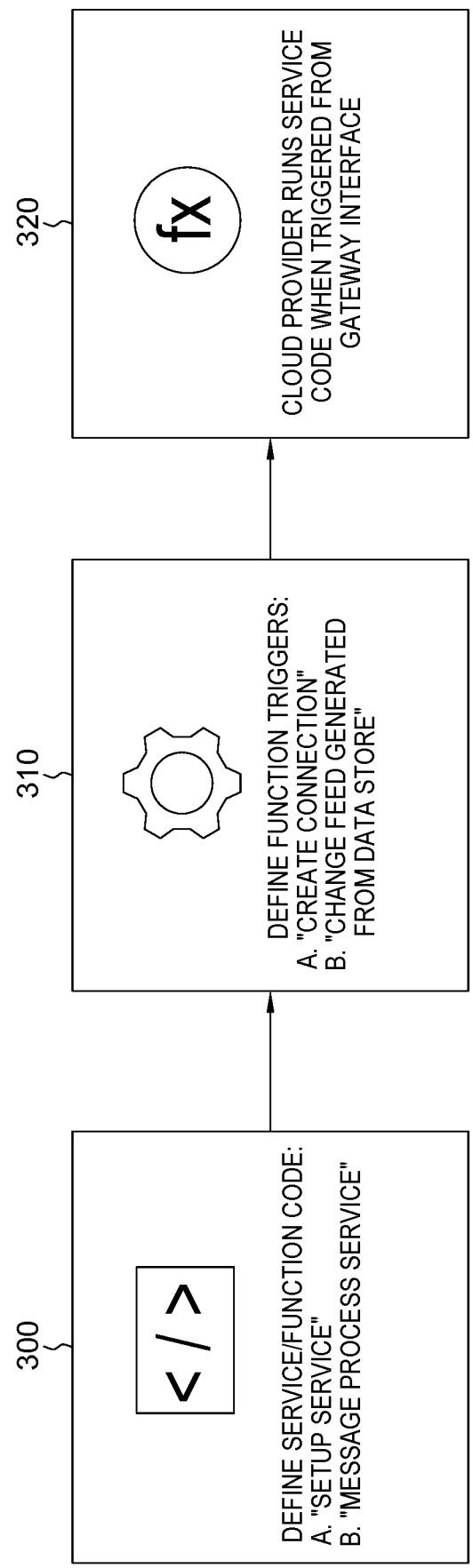
FIG. 3A depicts one embodiment of a serverless computing-based, continuous gateway watch workflow, in accordance with one or more aspects of the present invention.

By way of example, FIG. 3A depicts a further embodiment of a serverless computing-based, continuous gateway watch workflow, in accordance with one or more aspects of the present invention. In one or more implementations, the serverless setup service and serverless message processing service can each be defined or provided as a function as a service (FaaS). In one embodiment, the user (or client), or other computing environment operator, can define the service or function code to be used, including the serverless setup service/function and serverless message processing service/function 300. In addition to establishing the serverless setup service and serverless messaging processing service to be used, agents (including function prompts) are defined and/or implemented 310. For instance, in one embodiment, the agents include a prompt agent to create a connection between the gateway interface and the data store based on receipt of a watch request, and a prompt agent to mutate (or change) the data change indication from the data store into a format desired by the user system or application. In this manner, a computing resource provider, such as a cloud-based provider, can run or execute the serverless setup service code and serverless messaging processing service code when respectively prompted or invoked from the gateway interface 320.

FIG. 3B depicts further details of one embodiment of a serverless setup service/function workflow and a serverless message processing service/function workflow, in accordance with one or more aspects of the present invention. As illustrated in FIG. 3B, in one embodiment, the services to be invoked can each be implemented as a function as a service (FaaS). The serverless setup service is synched to receipt of input, and in particular, to receipt of a watch request at the gateway interface, along with metadata about the user's original request. The serverless setup service is configured to facilitate establishing the upstream connection between the gateway interface and the data store at issue, with the output being a message confirming establishing of the upstream connection. The prompt condition can be, in one embodiment, receipt of the watch request from the user system. The setup function can be a cold start function, and the timeout for terminating the serverless service can be set to a desired default timeout, depending on the implementation.

In one or more embodiments, the serverless message process service/function is a synchronized function, where invoking of the function is synchronized, in one embodiment, to receipt of a data change indication from the data store at the gateway interface. The input to the message processing service can include metadata used in establishing the upstream connection, and the service is implemented to process the data change indication in the data stream from the data store, and to return a mutated data change message. The prompt condition, in one embodiment, is a data change on the data store provided to the gateway interface. In one or more implementations, the message process function is not cold-started, but rather pre-started to, for instance, reduce latency that could occur when a function is invoked for the first time, or after a period of inactivity. The timeout for stopping or terminating the message process function upon completion can be customized, for instance, based on user input or requirements. Note that each service/function will perform its particular process when the gateway interface is prompted by occurrence of the associated event. When the two services/functions noted are invoked, the computing resource provider to run the service either executes the service on a running server, or if there is no server currently available, can activate a new server to execute the respective function.

Figure 4:
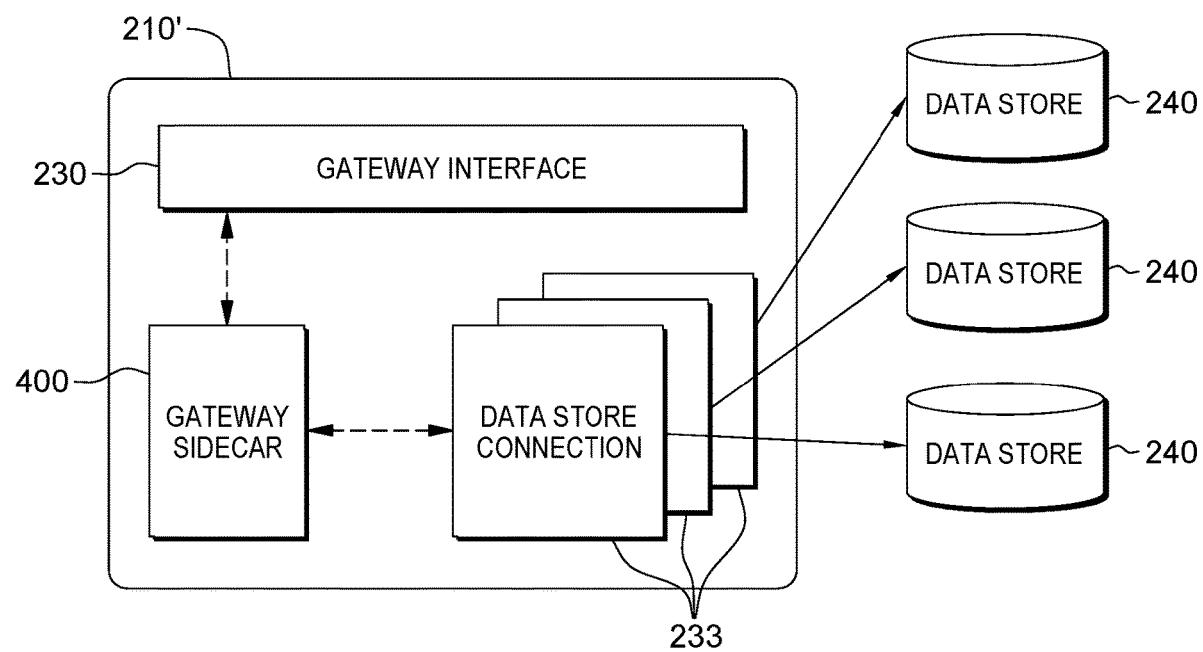
FIG. 4 depicts another embodiment of a computing environment to incorporate and/or use one or more aspects of the present invention.

FIG. 4 depicts another embodiment of a computing environment to incorporate and/or use one or more aspects of the present invention. In implementation, computing environment 210' can be similar to computing environment 210 of FIG. 2, and/or computing environment 100 of FIG. 1. In the implementation depicted, in addition to gateway interface 230, a gateway sidecar 400 is provided to interact with the function as a service (FaaS) code providing the serverless computing-based features discussed herein. In one implementation, gateway interface 230 interfaces to a user or client system, such as to a user or client application, and accepts data access requests, including a watch request. The gateway interface can maintain data store connections 233 to multiple data stores 240 with lifecycle management via gateway sidecar 400.

In one or more embodiments, gateway sidecar 400 interacts with the function as a service (FaaS) code to provide the functionality disclosed herein. For instance, gateway sidecar 400 facilitates calling the setup service/function serverless to establish the data store connection(s) 233, that is, the upstream connection(s) between the gateway and the data store(s) 240, and to monitor for a data change in a data store, and to invoke or spawn the message process service serverless to process a data change indication or feed, and forward the appropriate mutated data change message from the gateway to the user system, after which, the message process service can be stopped or terminated serverless. In this manner, the message process service only operates when needed.

Figure 5:
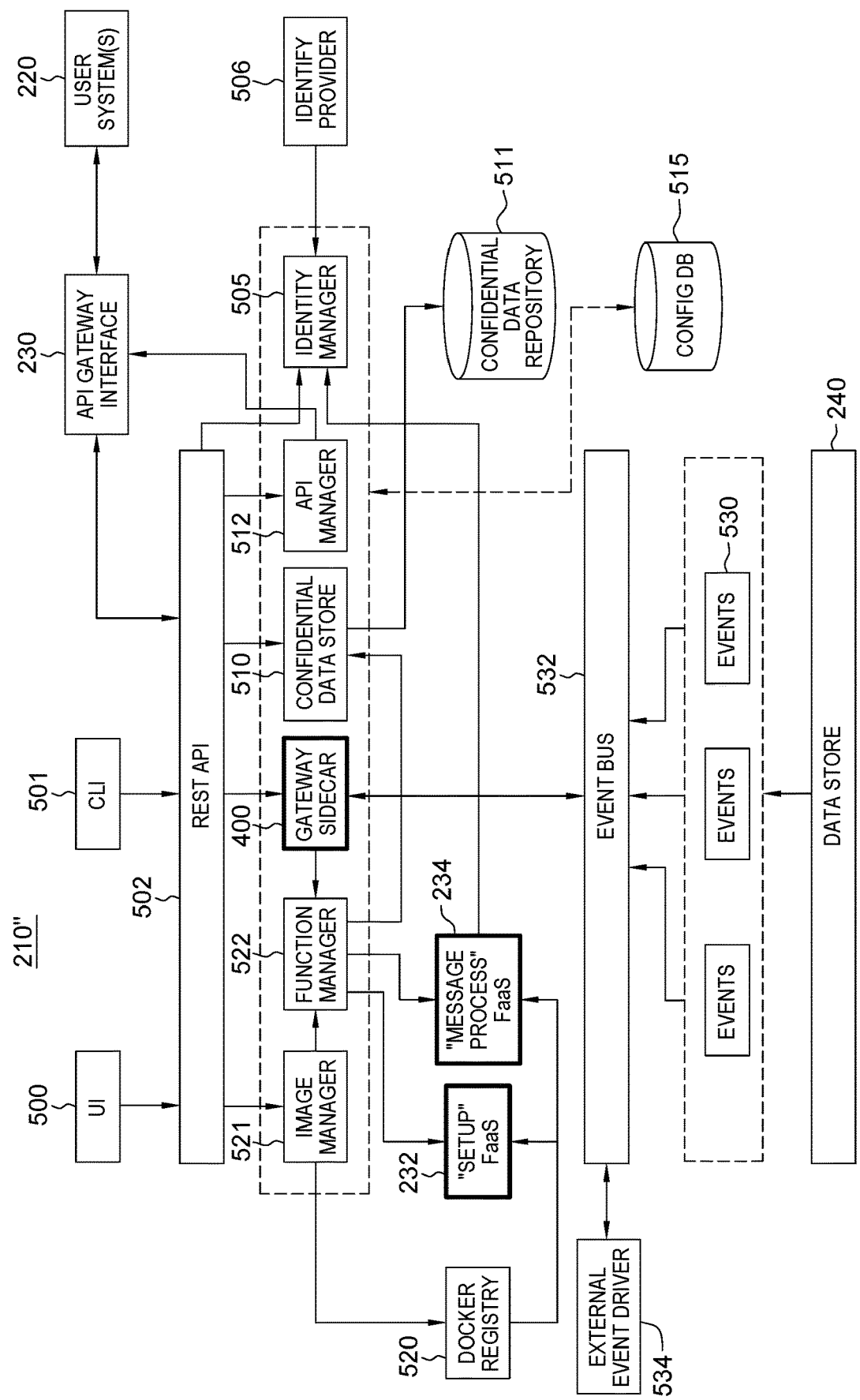
FIG. 5 depicts a more detailed embodiment of a computing environment to incorporate and use one or more aspects of the present invention.

FIG. 5 depicts a more detailed embodiment of a computing environment 210" to incorporate and use one or more aspects of the present invention. In one or more embodiments, aspects of computing environment 210" can be the same as or similar to one or more features of computing environment 100, as well as the same as or similar to one or more aspects of computing environments 210 of FIG. 2 and 210' of FIG. 4. As illustrated, multiple types of clients or users can access the function as a service (FaaS)/serverless system, including one or more user interfaces (UI) 500, one or more command line interfaces (CLI) 501, and one or more user or client systems 220, via an API gateway interface 230. In the implementation depicted, the provided interface for the user is encapsulated as a representation state transfer (REST) API 502, as a way of connecting components in the service or microservice architecture.

Authentication and authorization can be managed by an identity manager 505 with reference to one or more identify providers 506. Authentication authorization can be facilitated by maintaining client or user-related information in a confidential data store 510 from a confidential data repository 511. The entire configuration in the system can be stored in a configuration database 515. As a function as a service (FaaS), in one implementation, the setup service ("setup" FaaS) 232 and message process service (message process FaaS) 234 can be built as runnable in a Docker image stored in a Docker registry 520. Supporting services include an image manager 521, a function manager 522, and an API manager 512, along with gateway sidecar 400, which facilitates invoking of the respective setup service 232 and message process service 234. When there is a data change on data store 240, an event 530 is sent to an event bus 532 driven, in one embodiment, by an external event driver 534. A notification is then sent to function manager 522 via gateway sidecar 400, and function manager 522 can invoke or spawn the message process service ("message process" FaaS) 234. The output of the service, that is, the mutated data change message, can then be sent via REST API 502 and gateway interface 230 to user system 220 submitting the watch request.

Further details of one embodiment of facilitating processing within a computing environment, as it relates to one or more aspects of the present invention, are described with reference to FIGS. 6A-6B.

Referring to FIG. 6A, in one embodiment, the gateway interface executing on one or more processors of the computing environment, receives a watch request from a user system to monitor a data store for data change 600. Based on receiving the watch request, the gateway interface invokes a serverless setup service to establish a connection between the gateway interface and the data store of the computing environment to be monitored for data change 602. Further, the gateway interface invokes a serverless message processing service to mutate a data change indication from the data store, received at the gateway interface across the connection, into a mutated data change message indicative of a data change at the data store for return to the user system pursuant to the watch request, and to terminate thereafter 604.

In one example, the connection between the gateway interface and the data store to be monitored for data change has an unbounded execution time when established 606.

In one embodiment, the invoking of the serverless setup service includes invoking, by the gateway service, the serverless setup service with user parameters, associated with the watch request, to establish the connection between the gateway interface and the data store to be monitored for data change 608.

Referring to FIG. 6B, in one embodiment, the method further includes monitoring, by the gateway interface, the connection between the gateway interface and the data store for the data change indication from the data store 610. In one example, the method further includes receiving at the gateway interface, across the connection, the data change indication from the data store, where the data change indication from the data store includes a first data change indication format, and the mutated data change indication for return to the user system pursuant to the watch request includes a second data change indication format, the second data change indication format being different from the first data change indication format 612.

In one embodiment, the method further includes facilitating maintaining another unbounded execution time connection between the gateway interface of the computing environment and the user system based on the watch request 614. In one example, the method includes returning, by the gateway interface across the other unbounded execution time connection, the mutated data change message to the user system pursuant to the watch request 616.

In one embodiment, the serverless setup service is a first function as a service (FaaS), and the serverless message processing service is a second function as a service (Faas) 618.

One embodiment of a computing environment to incorporate and use one or more aspects of the present invention is described with reference to FIG. 7. As examples, the computing environment may be of various architectures and of various types, including, but not limited to: personal computing, client-server, distributed, virtual, emulated, partitioned, non-partitioned, cloud-based, grid, time-sharing, cluster, peer-to-peer, mobile, having one node or multiple nodes, having one processor or multiple processors, and/or any other type of environment and/or configuration, etc. that is capable of executing a process that, e.g., stores data in the selected manner described herein and retrieves and uses that data to generate an optimal task solution for a selected event. Aspects of the present invention are not limited to a particular architecture or environment.

Figure 7:
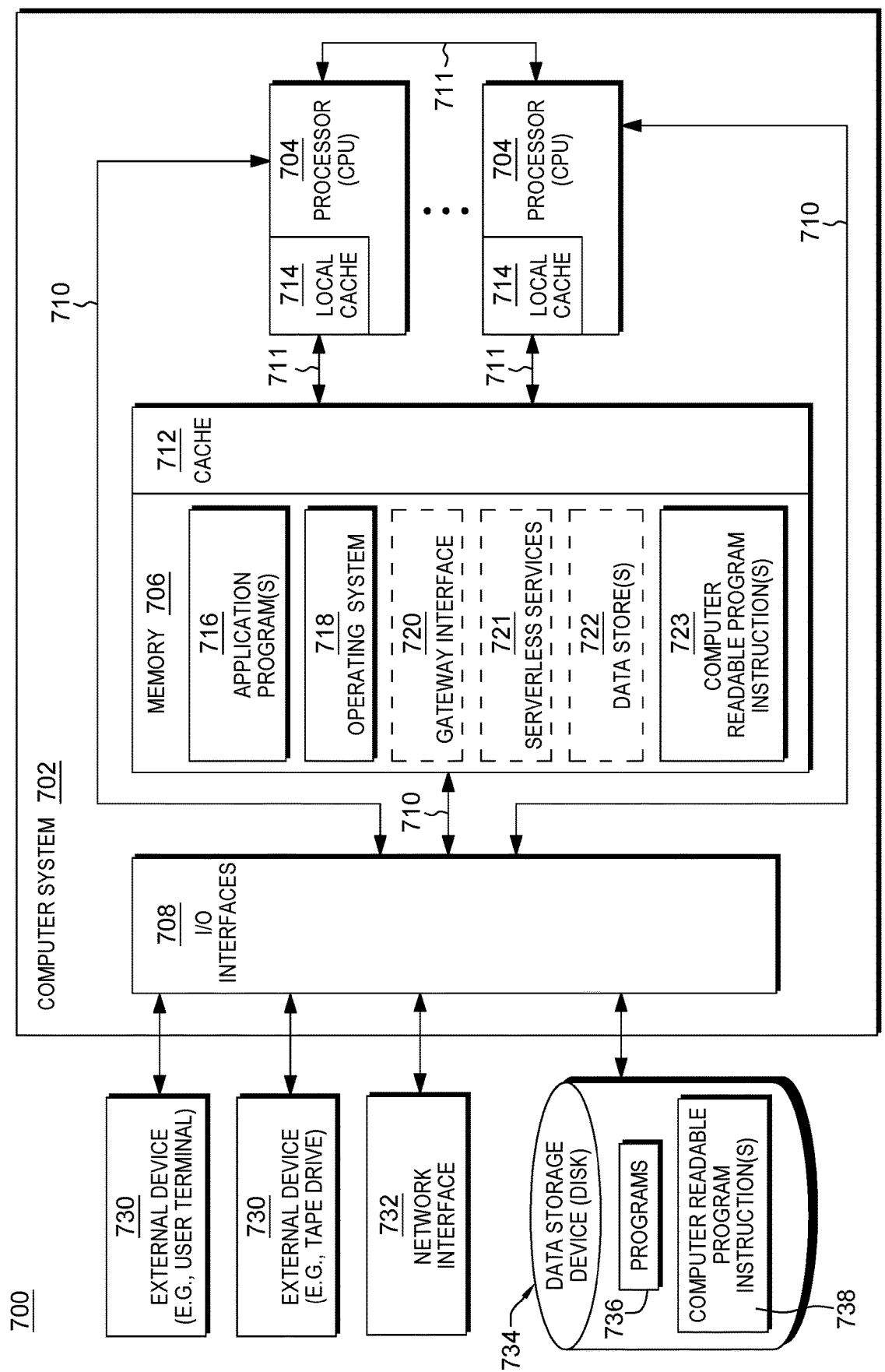
FIG. 7 depicts another example of a computing environment to include and/or use one or more aspects of the present invention.

Referring to FIG. 7, in one example, a computing environment 700 includes, for instance, a computer system 702 shown, e.g., in the form of a general-purpose computing device. Computer system 702 may include, but is not limited to, one or more processors or processing units 704 (e.g., central processing units (CPUs) and/or special-purpose processors, etc.), a memory 706 (a.k.a., system memory, main memory, main storage, central storage or storage, as examples), and one or more input/output (I/O) interfaces 708, coupled to one another via one or more buses and/or other connections. For instance, processors 704 and memory 706 are coupled to I/O interfaces 708 via one or more buses 710, and processors 704 are coupled to one another via one or more buses 711.

Bus 711 is, for instance, a memory or cache coherence bus, and bus 710 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 706 may include, for instance, a cache 112, such as a shared cache, which may be coupled to local caches 714 of one or more processors 704 via, e.g., one or more buses 711. Further, memory 706 may include one or more programs or applications 716, at least one operating system 718, and optionally, one or more of a gateway interface 720, serverless service(s) 721, and data store(s) 722, which are used in accordance with one or more aspects of the present invention, as well as one or more computer readable program instructions 723. Computer readable program instructions 723 may be configured to carry out functions of embodiments of aspects of the invention.

Computer system 702 may communicate via, e.g., I/O interfaces 708 with one or more external devices 730, such as a user terminal, a tape drive, a pointing device, a display, and one or more data storage devices 734, etc. A data storage device 734 may store one or more programs 736, one or more computer readable program instructions 738, and/or data, etc. The computer readable program instructions may be configured to carry out functions of embodiments of aspects of the invention.

Computer system 702 may also communicate via, e.g., I/O interfaces 708 with network interface 732, which enables computer system 702 to communicate with one or more networks, such as a local area network (LAN), a general wide area network (WAN), and/or a public network (e.g., the Internet), providing communication with other computing devices or systems.

Computer system 702 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 702. Examples, include, but are not limited to: microcode, device drivers, redundant processing units, external disk drive arrays, RAID systems, tape drives, and data archival storage systems, etc.

Computer system 702 may be operational with numerous other general-purpose or special purpose computing system environments or configurations. Examples of well-known computing systems, environments, and/or configurations that may be suitable for use with computer system 702 include, but are not limited to, personal computer (PC)

systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computing environments described herein are only examples of computing environments that can be used. Other environments, including but not limited to, non-partitioned environments, partitioned environments, cloud environments, distributed environments, non-distributed environments, virtual environments and/or emulated environments, may be used; embodiments are not limited to any one environment. Although various examples of computing environments are described herein, one or more aspects of the present invention may be used with many types of environments. The computing environments provided herein are only examples.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more aspects of one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, additional, fewer and/or other features, constraints, tasks and/or events may be considered. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer-readable storage media and program instructions embodied therewith, the program instructions being readable by a processing circuit to cause the processing circuit to perform a method comprising:
        receiving, at a gateway interface of the computing environment, a watch request from a user system to monitor a data store for data change;
        invoking, by a gateway sidecar to the gateway interface based on the watch request, a serverless setup service to establish a continuous connection between the gateway sidecar of the computing environment and the data store to be monitored for data change;
        watching by the gateway sidecar across the connection for a data change indication from the data store; and
        invoking, by the gateway sidecar based on obtaining across the connection the data change indication from the data store, a serverless message processing service to mutate the data change indication from the data store into a mutated data change message indicative of a data change at the data store for return to the user system pursuant to the watch request, and to terminate thereafter, wherein the serverless setup service and the serverless message processing service are different serverless services invoked by the gateway sidecar to the gateway interface.

2. The computer program product of claim 1, wherein the connection between the gateway sidecar and the data store to be monitored for data change has an unbounded execution time when established.

3. The computer program product of claim 2, wherein the invoking of the serverless setup service comprises invoking, by the gateway sidecar, the serverless setup service with user parameters, associated with the watch request, to establish the connection between the gateway sidecar and the data store to be monitored for data change.

4. The computer program product of claim 2, further comprising monitoring, by the gateway sidecar, the connection between the gateway sidecar and the data store for the data change indication from the data store.

5. The computer program product of claim 4, further comprising receiving at the gateway sidecar, across the connection, the data change indication from the data store, wherein the data change indication from the data store comprises a first data change indication format, and the mutated data change message for return to the user system pursuant to the watch request comprises a second data change indication format, the second data change indication format being different from the first data change indication format.

6. The computer program product of claim 2, further comprising facilitating maintaining another unbounded execution time connection between the gateway interface of the computing environment and the user system based on the watch request.

7. The computer program product of claim 6, further comprising returning, by the gateway interface across the other unbounded execution time connection, the mutated data change message to the user system pursuant to the watch request.

8. The computer program product of claim 1, wherein the serverless setup service is a first function as a service (FaaS), and the serverless message processing service is a second function as a service (FaaS).

9. A computer-implemented method comprising:
 receiving, at a gateway interface of a computing environment, a watch request from a user system to monitor a data store for data change;
  invoking, by a gateway sidecar to the gateway interface based on the watch request, a serverless setup service to establish a continuous connection between the gateway sidecar of the computing environment and the data store to be monitored for data change;
  watching by the gateway sidecar across the connection for a data change indication from the data store; and
  invoking, by the gateway sidecar based on obtaining across the connection the data change indication from the data store, a serverless message processing service to mutate the data change indication from the data store into a mutated data change message indicative of a data change at the data store for return to the user system pursuant to the watch request, and to terminate thereafter, wherein the serverless setup service and the serverless message processing service are different serverless services invoked by the gateway sidecar to the gateway interface.

10. The computer-implemented method of claim 9, wherein the connection between the gateway sidecar and the data store to be monitored for data change has an unbounded execution time when established.

11. The computer-implemented method of claim 10, wherein the invoking of the serverless setup service comprises invoking, by the gateway sidecar, the serverless setup service with user parameters, associated with the watch request, to establish the connection between the gateway sidecar and the data store to be monitored for data change.

12. The computer-implemented method of claim 10, further comprising:
 monitoring, by the gateway sidecar, the connection between the gateway sidecar and the data store for the data change indication from the data store; and
 receiving at the gateway sidecar, across the connection, the data change indication from the data store, wherein the data change indication from the data store comprises a first data change indication format, and the mutated data change message for return to the user system pursuant to the watch request comprises a second data change indication format, the second data change indication format being different from the first data change indication format.

13. The computer-implemented method of claim 10, further comprising:
 facilitating maintaining another unbounded execution time connection between the gateway interface of the computing environment and the user system based on the watch request; and
 returning, by the gateway interface across the other unbounded execution time connection, the mutated data change message to the user system pursuant to the watch request.

14. The computer-implemented method of claim 9, wherein the serverless setup service is a first function as a service (FaaS), and the serverless message processing service is a second function as a service (FaaS).

15. A computer system for facilitating processing within a computing environment, the computer system comprising:
 a memory; and
 at least one processor in communication with the memory, wherein the computer system is configured to perform a method, the method comprising:
  receiving, at a gateway interface of the computing environment, a watch request from a user system to monitor a data store for data change;
  invoking, by a gateway sidecar to the gateway interface based on the watch request, a serverless setup service to establish a continuous connection between the gateway sidecar of the computing environment and the data store to be monitored for data change;
  watching by the gateway sidecar across the connection for a data change indication from the data store; and
  invoking, by the gateway sidecar based on obtaining across the connection the data change indication from the data store, a serverless message processing service to mutate the data change indication from the data store into a mutated data change message indicative of a data change at the data store for return to the user system pursuant to the watch request, and to terminate thereafter, wherein the serverless setup service and the serverless message processing service are different serverless services invoked by the gateway sidecar to the gateway interface.

16. The computer system of claim 15, wherein the connection between the gateway sidecar and the data store to be monitored for data change has an unbounded execution time when established.

17. The computer system of claim 16, wherein the invoking of the serverless setup service comprises invoking, by the gateway sidecar, the serverless setup service with user parameters, associated with the watch request, to establish the connection between the gateway sidecar and the data store to be monitored for data change.

18. The computer system of claim 16, further comprising:
 monitoring, by the gateway sidecar the connection between the gateway sidecar and the data store for the data change indication from the data store; and
 receiving at the gateway sidecar, across the connection, the data change indication from the data store, wherein the data change indication from the data store comprises a first data change indication format, and the mutated data change message for return to the user system pursuant to the watch request comprises a second data change indication format, the second data change indication format being different from the first data change indication format.

19. The computer system of claim 16, further comprising:

facilitating maintaining another unbounded execution time connection between the gateway interface of the computing environment and the user system based on the watch request; and returning, by the gateway interface across the other unbounded execution time connection, the mutated data change message to the user system pursuant to the watch request.

20. The computer system of claim 15, wherein the serverless setup service is a first function as a service (FaaS), and the serverless message processing service is a second function as a service (FaaS).

\* \* \* \* \*